Nov. 21, 1933.  C. J. HALBORG  1,935,775
BROACHING MACHINE FOR GEARS
Filed April 24, 1931   2 Sheets-Sheet 1
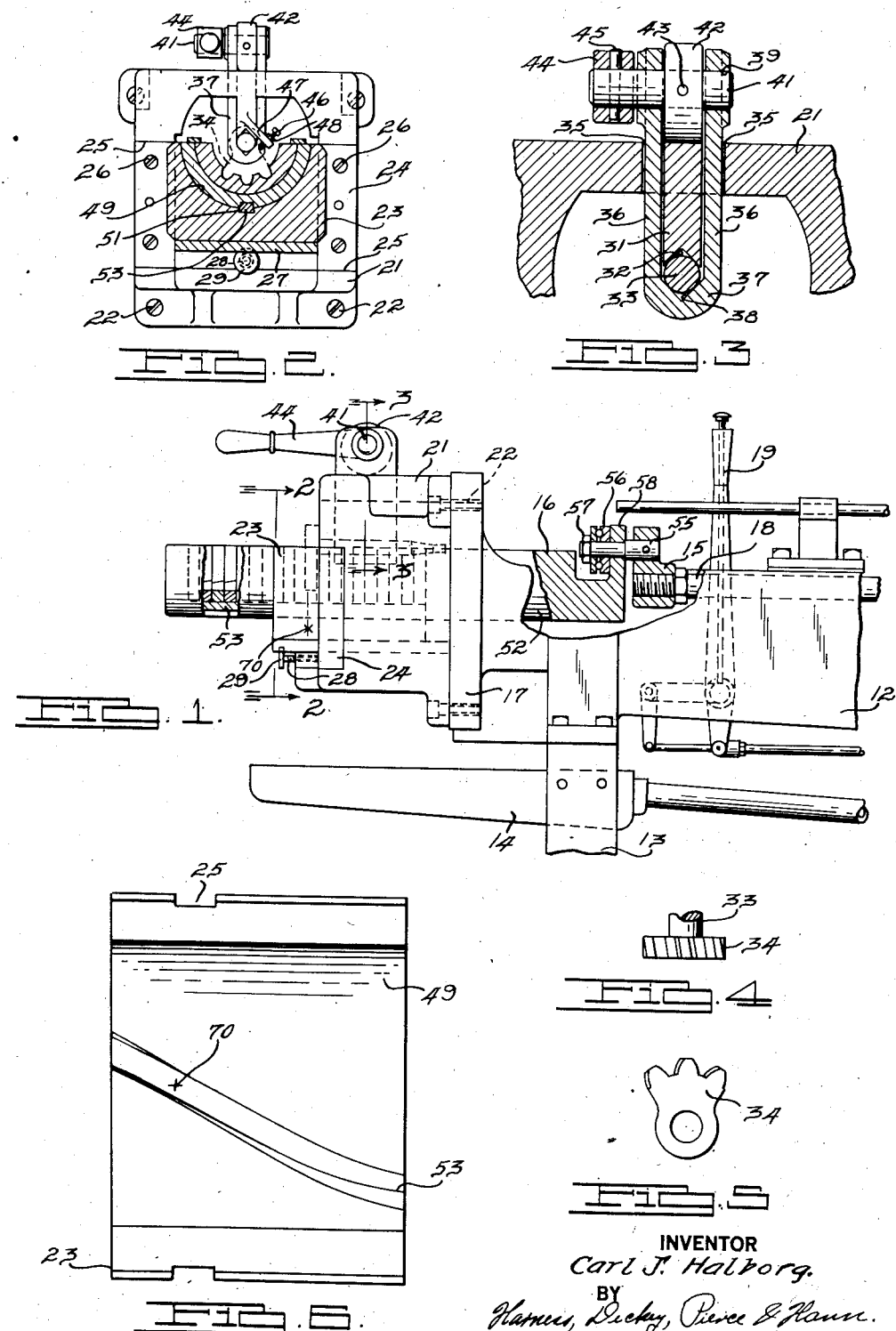
INVENTOR
Carl J. Halborg.
BY
Harness, Dickey, Pierce & Haun.
ATTORNEYS.

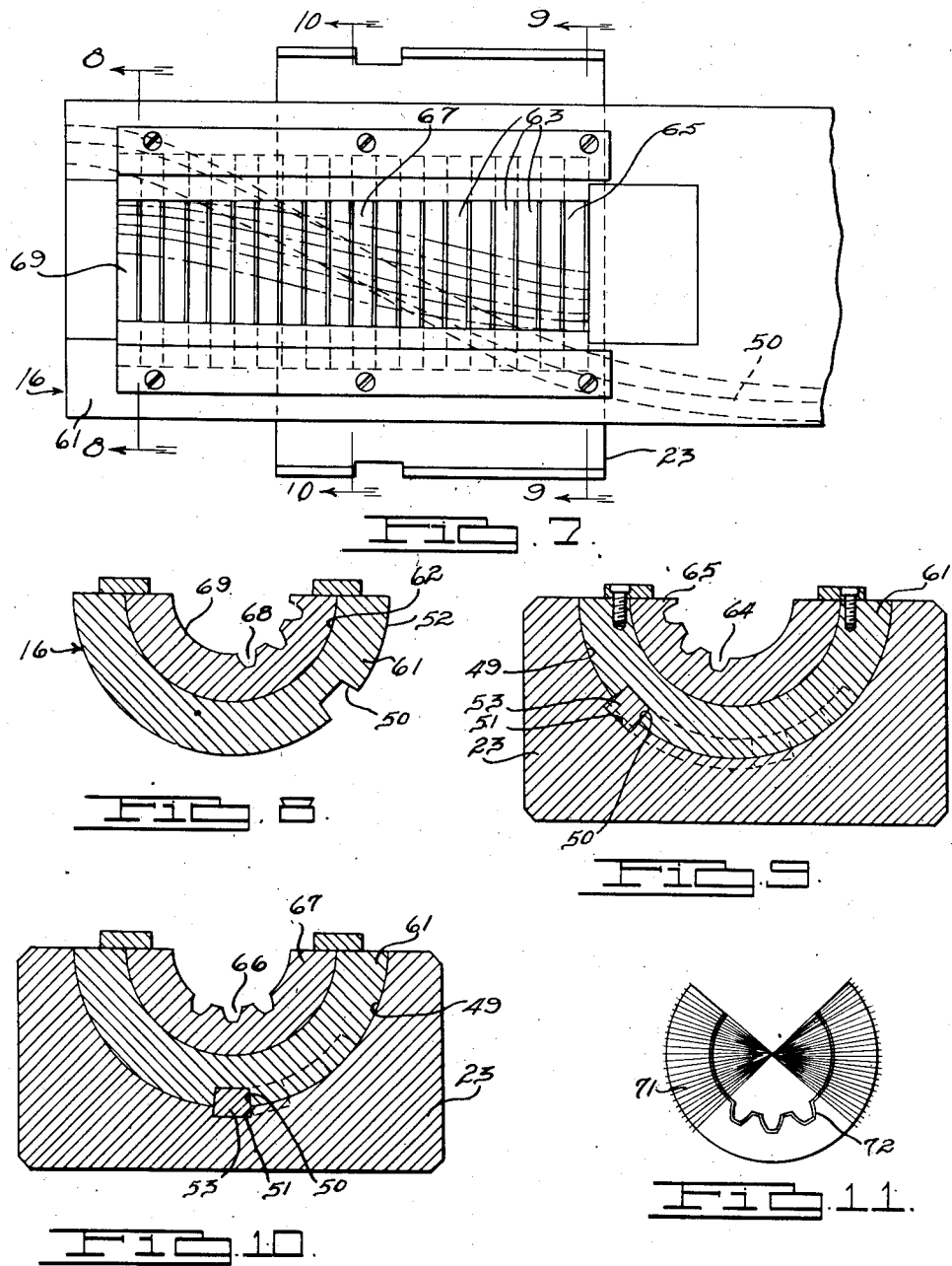

Patented Nov. 21, 1933

1,935,775

UNITED STATES PATENT OFFICE 1,935,775

BROACHING MACHINE FOR GEARS

Carl J. Halborg, Detroit, Mich., assignor to Colonial Broach Company, a corporation of Michigan Application April 24, 1931. Serial No. 532,438

6 Claims. (Cl. 90—8)

This invention relates to broaches and broaching fixtures and particularly to a broach and fixture for accurately cutting gear teeth of the helical type.

In my co-pending application Serial No. 518,063, filed February 25, 1931, and assigned to the assignee of the present invention, a broach and a fixture were described and claimed that cut teeth in a gear segment which were angularly disposed relative to a plane through the segment. This cutting operation was accomplished by supporting the segment at an angle to the broaching cutter which was drawn across the periphery of the segment while angularly related thereto. It is very evident that the teeth of the gear segment, formed during this operation, are provided with straight sides instead of sides which follow the curve of a helix. The teeth of the segment are, therefore, not of the true helical type and for accurate meshing with an adjacent segment or gear, it is necessary to machine the teeth by a further operation.

In practicing my invention I accurately machine the teeth cut in a segment by a broaching cutter described in my aforementioned co-pending application, by a further broaching operation which machine the sides of the teeth into true helical form.

One object of my invention is to provide a cutter for broaching teeth in a gear segment which shall be revolved as it is drawn longitudinally across the periphery of the segment.

Another object of my invention is to provide a plurality of cutters for a broaching tool, the cutting surfaces of which are offset laterally of each other an amount proportional to the amount of lead in the slot which effecting the revolution of the broach, to effect the alignment of the cutter with the teeth of a segment as they pass thereacross to shape the sides of the teeth into true helical form.

A further object of my invention is to provide a supporting fixture for a segment to be machined with shall be mounted in such relation to the broaching cutter that the cutter may be revolved thereabout without interference from the fixture.

Other objects and features of novelty of my invention will be either specifically pointed out or will become apparent when referring, for a better understanding of my invention, to the following description in conjunction with the accompanying drawings wherein:

Figure 1 is a broken view, in elevation, of a machine provided with a broach and fixture embodying features of my invention, Fig. 2 is a sectional view of the structure shown in Fig. 1 taken on the line 2—2 thereof, Fig. 3 is an enlarged sectional view of the structure shown in Fig. 1 taken on the line 3—3 thereof, Fig. 4 is a broken plan view of a gear segment which is finished in the broaching machine illustrated in Fig. 1, Fig. 5 is a view, in elevation, of the gear segment illustrated in Fig. 4, Fig. 6 is an enlarged plan view of a supporting plate for the broaching cutter having a rib therein which effects the revolution of the cutter during its longitudinal movement, Fig. 7 is an enlarged plan view of the broaching cutter illustrated in Figs. 1 and 2, Fig. 8 is a sectional view of the structure shown in Fig. 7 taken on the line 8—8 thereof, Fig. 9 is a sectional view of the structure shown in Fig. 7 taken on the line 9—9 thereof, Fig. 10 is a sectional view of the structure shown in Fig. 7 taken on the line 10—10 thereof, and Fig. 11 is a view, in elevation, of a broaching cutter illustrating the preferred method of effecting their construction.

My invention comprises in general a broaching machine which includes a cradle 12, the front end of which is supported on a standard 13 which also supports a drip pan 14. A head 15 is reciprocable in the cradle 12 for drawing a broaching cutter 16 through a face plate 17 provided on the front end of the cradle 12.

A suitable reciprocable operating mechanism (not shown) is connected to the head 15 through a pull bar 18 for reciprocating the broaching cutter 16 through the face plate 17. A control handle 19 is mounted on the side of the cradle and is connected by suitable means to the operating mechanism for the purpose of controlling the reciprocation of the broaching cutter.

A work retaining and cutter guiding chuck 21 is mounted on the front surface of the face plate 17 by bolts 22. A rest plate 23 is retained in the inner hollow opening of the chuck by plates 24 which registered in recesses 25 in the side of the rest plate and are supported on the chuck by bolts 26. A tapered plate 27 is mounted below the rest plate 23 in cooperating relation to an oppositely tapered surface on the bottom thereof for the purpose of adjusting the vertical position of the rest plate relative to the chuck. A bolt 28 is threaded in the chuck 21 and is provided with an enlarged head 29 which registers in a slot in the undersurface of the tapered plate 27. As the bolt 28 is screwed into or out of the chuck 21 the face plate 23 is moved therewith to respectively, raise or lower the rest plate 23 and the broaching cutter.

From the top inner surface of the chuck 21 a holding member 31 extends downwardly terminating in slot 32 of V-shape for receiving one-half of the surface of an extension 33 of a gear segment 34. Slots 35 are provided in the upper surface of the chuck 21 adjacent to the sides of the member 31 for receiving legs 36 of a U-shaped member 37 which encompasses the member 31. A slot 38 of V-shape is provided in the inner bottom surface of the U-shaped member 37 for engaging the other half of the extension 33. Apertures 39 are provided in the ends of the leg portions 36, which extend above the top surface of the chuck 21, in which a shaft 41 is rotatably supported. A cam 42 is mounted on the shaft 41 between the legs 36 and is retained in fixed relation to the shaft by a pin 43. A handle 44 is mounted on an extension of the shaft adjacent to the outer surface of one of the legs 36 and is retained in fixed relation to the shaft by a pin 45.

As shown in Figs. 1 and 3, the handle 44 has been rotated in a counter clock-wise direction to a position in which the cam 42 raised the U-shaped member 37 relative to the holding member 31, because of its engagement with the top surface of the chuck 21. During this movement the sides of the V-shaped slots 38 are drawn towards the sides of the V-shaped slot 32 to tightly clamp the extension 33 of the gear sector 34 therebetween.

After the teeth of the segment 34 have been machined, the handle 44 is revolved in a clockwise direction to permit the U-shaped member 37 to move downwardly and thereby release the extension 33 from between the clamping surfaces of the V-shaped slots 32 and 38, to permit its removal from the chuck. A new gear segment 34 is then inserted between the V-shaped slots 32 and 38 and is positioned relative to the broaching cutter 16 by a screw 46 which is adjustably supported by an arm 47 which extends from the front surface of the holding member 31. The screw 46 is provided with a clamping nut 48 by which it is retained in fixed adjusted position to engage the side of the segment 34 and to position its teeth relative to the teeth of the broaching cutter.

The upper surface 49 of the rest plate 23 is semi-cylindrical in shape and provided with a dove-tailed slot 51 of helical shape, as shown in Fig. 7. The slot is provided with a spherical lead which conforms to the spherical lead of the helical teeth to be machined on the gear segment. The outer surface 52 of the broach 16 is likewise of semi-cylindrical shape of a diameter substantially equal to that of the semi-cylindrical surface 49 of the rest plate 23 upon which the broach 16 rests for longitudinal sliding movement. A guide bar 53 of helical shape is mounted in the slot 51 of the rest plate 23, having sloping sides which engage the sides of the slot 51 to firmly support the bar in the plate. As the broach 16 is moved across the plate 23 the slot 50 thereof is in engagement with the bar 53 throughout the width of the plate which is disposed opposite to the gear segment 34. In order to permit the rotation of the broaching cutter 16 during its longitudinal movement, I connect the cutter to a shaft 55, which extends from the head 15 on the center line about which the cutter revolves, and provide a thrust bearing 56 between the retaining nut 57 and the extension 58 of the cutter, to reduce the frictional engagement therebetween.

Referring to Figs. 7 to 10 inclusive, I have shown my broaching cutter 16 as being provided with a body portion 61, having the outer semi-cylindrical surface 52 and an inner semi-cylindrical surface 62 in which a plurality of cutting blades 63 are mounted in fixed relation to the body portion. The cutters are all provided with the number of teeth to be finished on the gear sector and are herein shown as being three in number conforming to the three teeth illustrated on the gear segment 34.

Since it is only necessary to dress the sides of the teeth into the form of a helix, all of the cutters may be of substantially the same width, having teeth formations cut therein which are of greater width on the frontwardly disposed cutters than those of the rearwardly disposed cutters which conform to the exact shape of the teeth to be provided on the segments. As shown in Fig. 9, the teeth formation 64 are of greater dimensions on the frontwardly disposed cutter 65 than the teeth formation 66 in the centrally disposed cutter 67, as shown in Fig. 10, which in turn are of greater dimensions than teeth 68 disposed in the rearmost cutters 69, as shown in Fig. 8. The teeth of the rearmost cutter 69 conforms exactly to the contour of the finished teeth of the segment 34, and as the broach 16 is drawn across the gear segment the sides thereof are progressively machined away as the gear cutters 65, 67 and 69 and the intermediate cutters pass thereacross.

As will be noted in the figures, the slot 50, provided in the body portion 61 of the broaching cutters, is in alignment with the center tooth of the cutters and, since the gear sector is mounted directly over the bar 53 at 70, as shown in Figs. 1 and 6, all of the cutters will pass across the teeth of the segment as they move into centrally disposed relation to the rest plate 23, as shown in Fig. 10.

In Fig. 11 I have shown a preferred method of constructing the cutters, that of providing a plurality of washer like segments 71 which I prefer to clamp together and machine teeth like recesses in the inner periphery thereof in aligned relation. The individual members are then machined along a diameter to form a semicircle each diameter being offset a predetermined amount from each other relative to the position of the cutting teeth to have the teeth of one cutter in offset relation to those of another cutter when the cutters are mounted in the body portion 61 of the broach. Each individual cutter is then machined to effect a relief 72, on the sides of the cutting teeth and the width of the cutting teeth are enlarged as they approach the front end of the cutter.

While I have shown a segment of a gear provided with three teeth, it is to be understood that any number of teeth may be cut in a segment or gear in the above described manner by increasing the number of teeth provided in the cutters. It is within the purview of my invention to employ a cutter similar in shape to the washers shown in Fig. 11, and to cut teeth across the entire inner periphery thereof, which, when assembled in a body portion 61, would be capable of cutting or finishing the teeth on one-half of a gear. By rotating the gear 180 degrees and making a second operation thereon, all of the teeth of a gear would be capable of being finished into exact helical shape by two passes of the broaching cutter.

While I have described my broaching cutter and fixture as being employed for finishing gear teeth it is to be understood that the broaching cutter may be made of sufficient length to entirely machine the gear teeth. A slot in the shape of a desired helical angle may be provided in the body portion of the cutter with the sides thereof extending 90 degrees on each side of the slot. The body portion receives the cutters having teeth shaped recesses which are disposed centrally to said slot and which taper from the front to the rear of the body portion. The entire machining of the helical teeth may be accomplished by a single longitudinal movement of the broaching cutter which is revolvable as the cutters thereof pass across the periphery of the segment.

Since the rest plate 23 is readily removable by removing the plate 24, it is very apparent that other rest plates and cutters having guide bars 51 disposed on different helix angles, may be provided, which enables my broaching machine to readily adapt itself for finishing gear teeth to any desired contour disposed on various helical angles.

While I have shown and described but a single embodiment of my invention, it will be apparent to those skilled in the art that various changes, omissions, additions and substitutions may be made therein without departing from the spirit and scope of my invention, as set forth in the accompanying claims.

I claim as my invention:

1. A broaching cutter for forming teeth on the periphery of a gear blank including, in combination, a body portion and a plurality of laterally extending cutters of arcuate shape mounted therein in contiguous relation and provided with cutting edges which are offset radially relative to each other, means for moving said broaching cutter longitudinally, and means for revolving said broaching cutter during its longitudinal movement.

2. A broaching device for finishing the sides of a gear segment into true helical contour on a desired helical angle including, in combination, a plurality of cutters having serrations of desired contour, a body member having an outer surface of cylindrical shape, and an inner surface for receiving said cutters, means for clamping said cutters with the serrations in predetermined offset relation to each other, in said body portion and a supporting member for said body portion having means for effecting its revolution in accordance to the offset relation of said serrations during the longitudinal movement of said broaching cutter.

3. A broaching device for finishing the sides of a gear segment into true helical contour on a desired helical angle including, in combination, a plurality of cutters having serrations of predetermined varying contour, a body portion having an outer surface of cylindrical shape and an inner surface for receiving said cutters, means for clamping said cutters in said body portion with the serrations thereof in predetermined offset relation to each other, a supporting member for said body portion having means for effecting its revolution in accordance to the offset relation of said serrations during the longitudinal movement of said body portion, means for moving said body portion longitudinally and means for adjusting said body portion relative to said gear segment.

4. A broaching device for cutting and finishing the sides of a gear segment into true helical contour on a desired helical angle including, in combination, a plurality of cutters having serrations of progressive contour, a body member having an outer surface of cylindrical shape and an inner surface for receiving said cutters, means for clamping said cutters in said body portion to have the serrations thereof in predetermined offset relation to each other, and a supporting member for said body portion having means for effecting its revolution in accordance to the offset relation to said teeth during the longitudinal movement of said cutters across the periphery of said segment.

5. A broaching device for machining teeth on the periphery of a gear blank on a desired helical angle including in combination, a plurality of cutters having serrations of desired contour, a body member for receiving and encompassing said cutters, means for clamping said cutters in fixed position with the serrations in predetermined offset relation to each other in said body portion, and a supporting member for said body portion having means for effecting its revolution in accordance with the offset relation of said serrations during the longitudinal movement of said broaching cutter.

6. A broaching device for cutting gear teeth in the periphery of a blank on a desired helix angle including in combination, a plurality of cutters having teeth of progressive contour, a body member for receiving and supporting said cutters with the teeth thereof offset circumferentially relative to an adjacent cutter, means for retaining said cutters with the teeth in fixed offset relation, means for relatively moving the blank and member, and means for relatively rotating said member and blank during such movement in accordance with the degree of angular offset between said teeth.

CARL J. HALBORG.